United States Patent [19]
Dykzeul

[11] 3,908,898
[45] Sept. 30, 1975

[54] THERMOSTAT MOUNTING ASSEMBLY

[75] Inventor: Theodore J. Dykzeul, Rolling Hills, Calif.

[73] Assignee: Robertshaw Controls Company, Richmond, Va.

[22] Filed: Jan. 18, 1974

[21] Appl. No.: 434,702

[52] U.S. Cl. .................... 236/21 B; 236/102; 337/1
[51] Int. Cl.² .................... G05D 23/02; F24D 17/00
[58] Field of Search .............. 236/21 B, 21 R, 102; 337/398, 1

[56] References Cited
UNITED STATES PATENTS

| | | | |
|---|---|---|---|
| 2,303,702 | 12/1942 | Mantz | 236/21 B |
| 2,312,479 | 3/1943 | Ray | 236/21 B |
| 3,691,501 | 9/1972 | Katchka et al. | 236/21 R |

*Primary Examiner*—William E. Wayner
*Attorney, Agent, or Firm*—Anthony A. O'Brien

[57] ABSTRACT

A mounting assembly for a temperature control system for an appliance includes a mounting shank supporting a thermostat for extension into the appliance and carrying a housing externally of the appliance for mounting an abnormal temperature sensing switch such that the abnormal temperature sensing switch is accessible without removing the mounting shank from the appliance.

4 Claims, 5 Drawing Figures

U.S. Patent   Sept. 30,1975   Sheet 1 of 2   3,908,898

THERMOSTAT MOUNTING ASSEMBLY

BACKGROUND OF THE INVENTION

1. Field of the Invention

The present invention pertains to temperature control assemblies and, more particularly, to an assembly for mounting a thermostat and an abnormal temperature sensing switch on an appliance.

2. Description of the Prior Art

Control devices are conventionally utilized to control the flow of fuel to appliances, such as water heaters, furnaces and the like, in accordance with temperature. A temperature responsive device or thermostat is normally positioned interiorly of the appliance to sense a temperature therein and is responsive to temperature variations to operate a thermostatic valve to control fuel flow. An abnormal temperature sensing device, such as an electrical switch, is conventionally utilized to respond to abnormal temperatures to operate a safety device, such as by closing a safety valve, to prevent further supply of fuel to the appliance if the temperature increases to an abnormal level due to some malfunction in the system.

In the case of water heaters, it is conventional to utilize a rod-and-tube type thermostat mounted on a shank secured to the wall of the water heater with the thermostat extending into the tank, and the control device is normally mounted on a flange of the shank. The abnormal temperature sensing device conventionally takes the form of an electrical switch and is disposed in a recess or bulge formed in the tube of the thermostat such that it is disposed in the interior of the tank. This arrangement of the abnormal temperature sensing switch has the disadvantage that the entire shank and thermostat assembly must be removed from the wall of the water heater to permit replacement or repair of the switch.

SUMMARY OF THE INVENTION

The present invention is generally summarized in a mounting assembly for a temperature control system for an appliance including a thermostat adapted to extend within the appliance for normal temperature operation; an abnormal temperature sensing switch adapted to be operated in response to abnormal temperatures; and shank means having means for mounting the shank means on the appliance, means mounting the thermostat to extend within the appliance, and means mounting the abnormal temperature sensing switch externally of the appliance whereby the abnormal temperature sensing switch is accessible without removing the shank means from the appliance.

Accordingly, it is a basic object of the present invention to mount an abnormal temperature sensing switch on a shank at a position so as to be accessible for maintenance, repair and/or replacement.

Another object of the present invention is to form a recess in a cylindrical wall of a mounting shank for receiving an abnormal temperature sensing switch, the switch being exposed to temperatures within an appliance by thermal conduction.

A further object of the present invention is to arrange a cylindrical housing on a cylindrical body of a mounting shank to house an abnormal temperature sensing device, the housing having an axis transverse to the axis of the body and spaced therefrom.

Some of the advantages of the present invention over the prior art are that the thermostat structure need not be varied to house the abnormal temperature sensing switch, the mounting shank can be simply formed to provide a mount for the thermostat and a control device as well as a housing for the abnormal temperature sensing switch, and the abnormal temperature sensing switch is easily accessible for maintenance, repair and/or replacement without requiring disassembly of the control device, mounting shank and thermostat.

Other objects and advantages of the present invention will become apparent from the following description of the preferred embodiment taken in conjunction with the accompanying drawings.

DESCRIPTION OF THE PREFERRED EMBODIMENT

While the mounting assembly of the present invention can be utilized with various types of control devices and various types of heating appliances and can be utilized in connection with electrical heating elements as well as gaseous fuel burning heater elements, the present invention will be described in connection with a fuel burner control system for a hot water heater.

Figure 1:
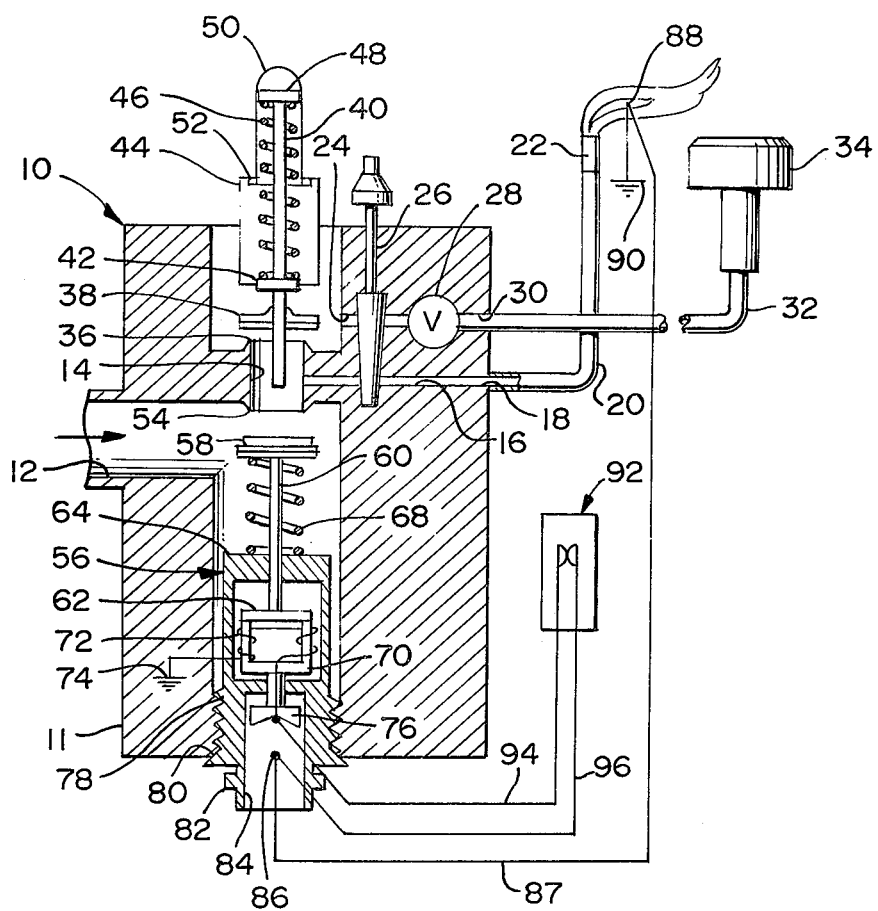
FIG. 1 is a schematic diagram of a temperature control system embodying the present invention.

A temperature control system utilizing a mounting assembly according to the present invention is illustrated in FIG. 1 and includes a control device 10 having a casing 11 with an inlet port 12 for receiving fuel from a gas source (not shown) and communicating with a common internal passage 14 from which a pair of branch passages are controlled. One branch passage defines a pilot flow passage 16 leading to a pilot flow outlet port 18 in the casing which communicates with a conduit 20 for supplying fuel to a pilot burner 22. The other branch passage defines a main flow passage 24 controlled by a manually operable on-off valve 26 and a thermostatically operated valve 28, the valve 26 also controlling flow through pilot passage 16. Valves 26 and 28 control flow through a main flow outlet port 30 communicating with a conduit 32 for supplying fuel to a main burner 34.

The pilot flow passage 16 communicates with the common passage 14 intermediate its opposite ends which define upstream and downstream valve seats. Downstream valve seat 36 is controlled by combined reset and valve means including a valve member 38 carried by a reset stem 40. The upper end of the stem 40 extends through a sealing collar 42 on a plunger housing 44, and a coiled spring 46 is disposed around the stem 40 and mounted in compression between the collar 42 and a disc 48 on the end of the stem. The stem 40 is retained in the housing 44 by means of a hollow push button 50 mounting the disc 48 and having an annular bottom flange 52 engaging the housing wall surrounding an opening therein.

The upstream valve seat 54 is controlled by an electromagnetic safety assembly, indicated generally at 56, having a safety shutoff valve member 58 movably disposed for cooperation with the valve seat 54. Valve member 58 is fixed to one end of an armature stem 60 which has an opposite end carrying an armature 62 located in a fixed magnet housing 64 such that the stem 60 is slidably disposed relative to the housing. A coiled spring 68 is disposed around the armature stem 60 and mounted in compression between the top wall of the magnet housing 64 and the under surface of the valve member 58 to bias the valve member toward a closed position against the valve seat 54. Valve member 58, stem 60 and armature 62 are movable as a unit between released and attracted positions relative to a fixed electromagnet in the form of a generally U-shaped magnet core 70 with a winding 72 wound therearound. One end of winding 72 is connected to a ground terminal 74 and the other end is connected to an electrical conductor 76.

A bottom end wall of the magnet housing 64 is defined by a magnet base 78 having external threads such that the entire electromagnetic safety assembly 56 can be threaded into a suitable opening in the casing 11. In order to prevent fuel leakage from the opening, the threads are provided with a sealing compound and a tapered sealing lip 80 on the periphery of the magnetic base 78 to provide a sealtype relationship with the periphery of the opening.

The electrical conductor 76 extends through the top portion of the magnet base 78 and has a concave surface disposed in the upper part of a cavity formed in the bottom part of the magnet base. A hexagonal periphery 82 on the exterior of the magnet base 78 receives a wrench or tool for tightening the electromagnetic safety assembly 56 in the threaded opening in the casing 11. The bottom of magnet base 78 has a threaded opening 84 which receives a thermocouple cable connector (not shown) including a conductor 86, and a thermocouple lead 87 extends from one side of a thermocouple 88 to the conductor 86 while the other side of the thermocouple 88 is connected to a ground terminal 90. The thermocouple 88 is mounted in flame sensing proximity to the pilot burner 22 so as to be heated from the flame thereof.

Figure 5:
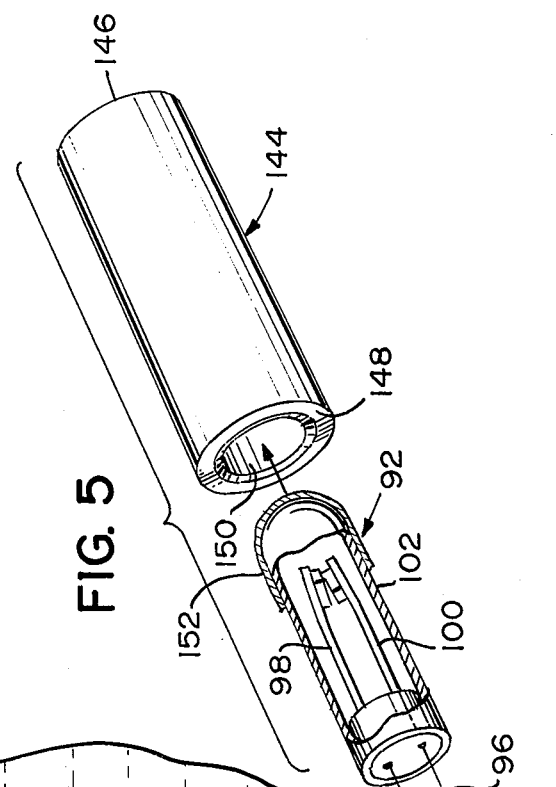
FIG. 5 is an exploded view of an abnormal temperature sensing switch and a housing therefor of the mounting assembly of the present invention.

An abnormal temperature sensing switch 92 includes a pair of contacts connected in series between conductor 76 and conductor 86 by leads 94 and 96. The switch 92 can have any desirable structure to permit the opening and closing of the switch contacts, such as by utilizing a pair of bimetal contact elements 98 and 100 disposed in a tubular casing 102, as illustrated in FIG. 5. The abnormal temperature sensing switch 92 is calibrated to respond to a predetermined abnormal temperature condition and, thus, defines a limit switch operable at a higher temperature than that of the normal temperature responsive thermostatic valve 28.

Figure 2:
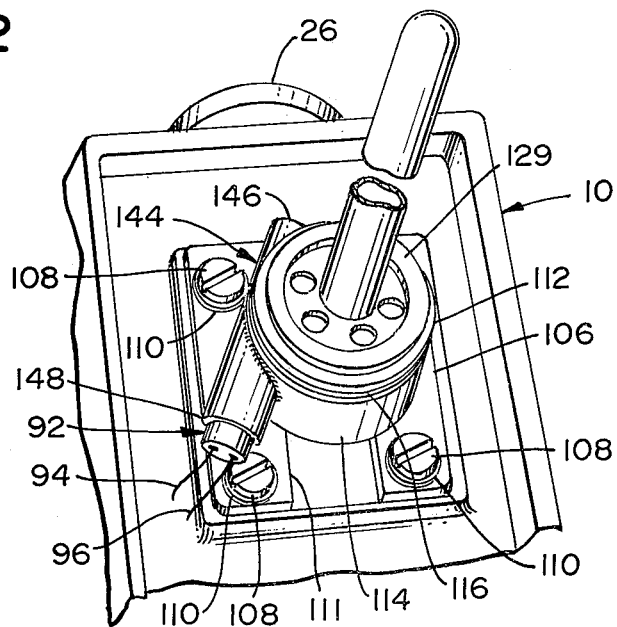
FIG. 2 is a broken perspective of a mounting assembly according to the present invention.
Figure 4:
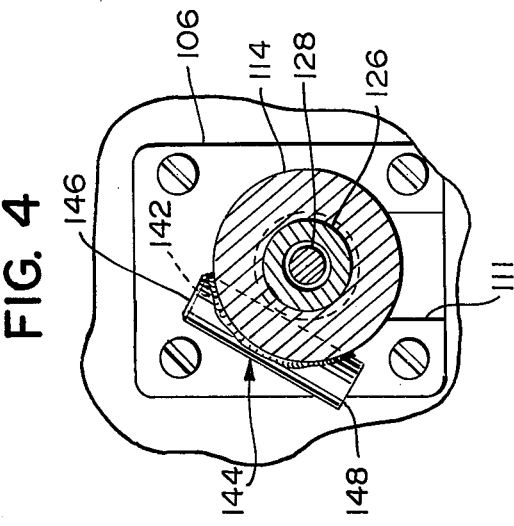
FIG. 4 is a section taken along line 4—4 of FIG. 3.
Figure 3:
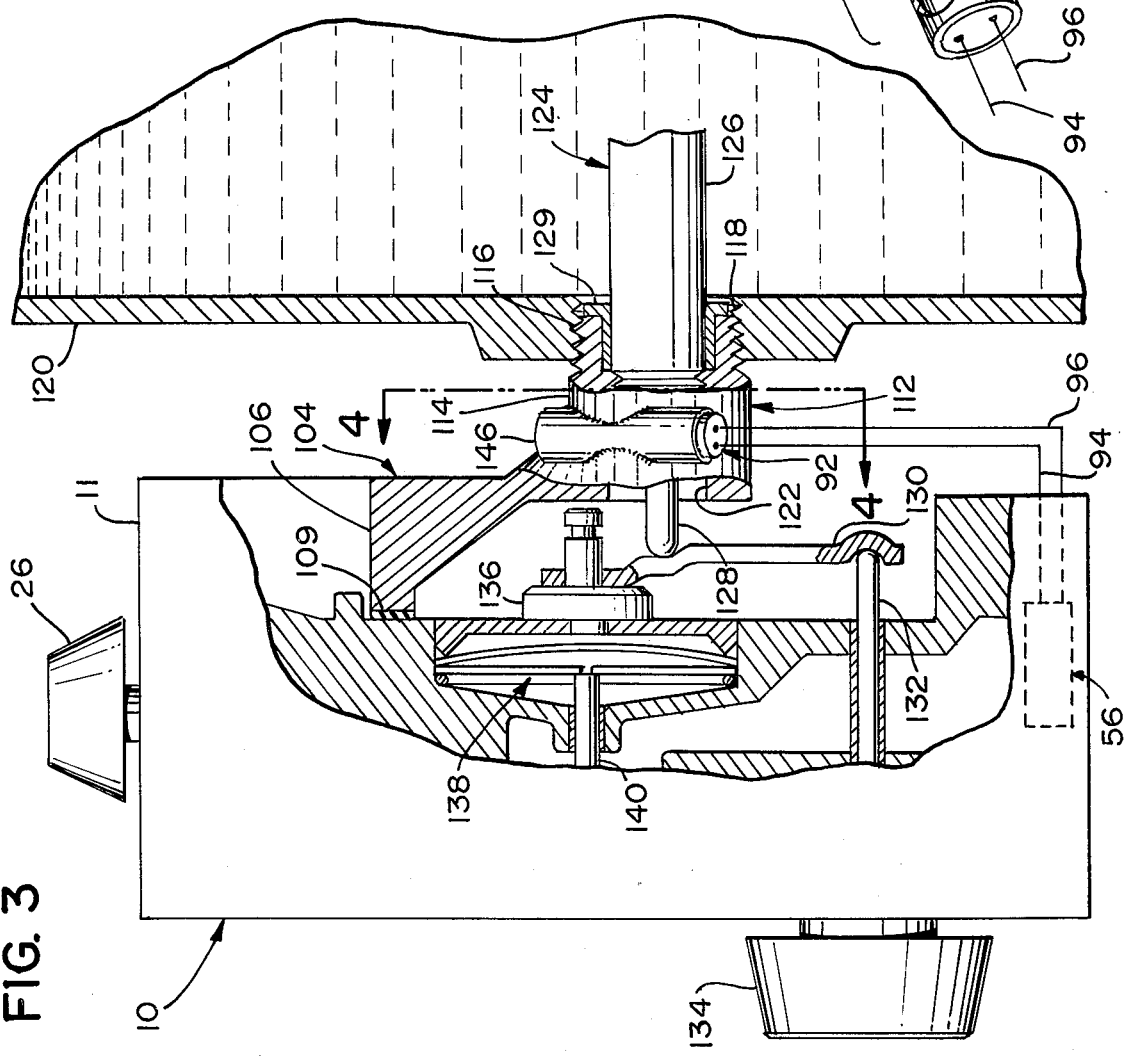
FIG. 3 is a side elevation with parts broken away and parts in section of a mounting assembly according to the present invention in schematic relationship with a control device.

A mounting assembly according to the present invention is illustrated in FIGS. 2, 3 and 4 and includes a mounting shank 104 made of a material such as brass and having a flange 106 mounting the control device 10 by means of screws 108, the flange 106 being received in a recess in the back of the casing 11 of the control device. A layer of thermally insulating material 109, such as Mylar, Melamine or a non-woven polyester material, is disposed between flange 106 and casing 11, and thermally insulating washers 110 of similar material are disposed between screws 108 and flange 106. The flange 106 has a slot 111 therein to permit passage of electrical wires and to provide clearance for a thermostatic valve operating lever to be described hereinafter. A cylindrical body 112 extends substantially transversely from the flange 106 and has a smooth cylindrical external surface 114 disposed adjacent the flange and a threaded external surface 116 for engaging an internally threaded bore 118 in a wall 120 of the tank of a water heater. The body 112 has a central bore 122 therethrough with a portion of the bore 122 being internally threaded to mount a rod-and-tube type thermostat indicated generally at 124.

As is conventional, the rod-and-tube type thermostat 124 includes a tube 126 made of a material, such as copper, having a relatively high thermal coefficient of expansion and a rod 128 disposed within the tube and made of a material, such as "Invar", having a relatively low thermal coefficient of expansion. Tube 126 has an externally threaded open end engaging the internally threaded portion of bore 122, and an electrically insulating cup 129 surrounds tube 126 within the body 112 of the shank. The distal ends of the tube 126 and the rod 128 are secured together such that the rod is axially movable within the tube with temperature variations. The free end of the rod 128 engages an operating lever 130 having an indentation in one end thereof engaging the end of an adjusting shaft 132 which is axially movable by means of a temperature setting dial 134. The other end of operating lever 130 carries an operating button 136 for actuating a conventional snap-acting clicker mechanism 138 to move a plunger 140 operating the thermostatic valve 28. The clicker mechanism 138 is housed in a recess in the casing 11 of the control device 10 and is operative in conventional manner to move over center between operative and inoperative positions to open and close the thermostatic valve 28.

In accordance with the present invention, a generally cylindrical recess 142 is formed in the surface 114 of body 112 having an axis transverse to the axis of the body 112 and spaced therefrom to form a secant with the surface 114. A cylindrical sleeve-like housing 144 made of a metal such as brass or copper and having a closed end 146 and an open end 148 is disposed in the recess 142 with a portion of the outer surface of the housing extending beyond the surface 114. The housing 144 is preferably brazed to the shank 104; however, any suitable means can be used to secure the housing to the shank. If desired, the shank 104 and housing 144 can be cast as an integral one-piece structure of a material such as brass.

The diameter of the inner wall 150 of housing 144 is substantially the same as the outer diameter of the tubular casing 102 of abnormal temperature sensing switch 92 such that the abnormal temperature sensing switch can be slid into the housing with a push-fit. The casing 102 of the abnormal temperature sensing switch 92 can be coated with silicone grease, such as General Electric type G-640, as shown at 152 in FIG. 5, in order to facilitate assembly of the abnormal temperature sensing switch 92 with the housing 144 and assure predetermined temperature operation in that the grease 152 helps to hold the abnormal temperature sensing switch in place and provides a heat conductive transfer coating to provide excellent switch temperature response.

In operation, the pilot burner 22 is lit after valve 26 is turned to a pilot position and button 50 is depressed to move safety valve member 58 away from valve seat 54 to permit fuel flow through pilot passage 16 to the pilot burner. Once a pilot flame is established, it is sensed by thermocouple 88 which generates sufficient electricity to energize core 70 and hold armature 62 against the force of spring 68. Abnormal temperature sensing switch 92 is closed at all temperatures below a predetermined abnormal temperature such that a complete circuit is established for the thermocouple current to hold the valve open unless the abnormal temperature sensing switch 92 senses a temperature above the abnormal temperature.

Once the pilot flame is established, fuel flow to the main burner 34 is controlled by thermostatically operated valve 28 in accordance with the operation of thermostat 124 in response to temperature variations in the tank of the water heater. An operating temperature is set by adjustment of knob 134 such that when the temperature of the water in the tank is below the set temperature, the rod 128 is moved sufficiently toward the control device 10 to operate the clicker mechanism 138 and open the thermostatically operated valve 28 to supply fuel to the main burner 34 and increase the temperature of the water. Once the temperature of the water increases above the set temperature, the rod 128 will be moved away from the control device 10 sufficiently to close the thermostatically operated valve 28 and stop the supply of fuel to the main burner.

Should the temperature in the tank continue to increase due to some malfunction in the temperature control system, the abnormal temperature sensing switch 92 will open once the temperature exceeds the predetermined abnormal temperature, and the opening of abnormal temperature sensing switch 92 opens the thermocouple circuit thereby deenergizing magnet core 70 to permit spring 68 to force valve member 58 against valve seat 54 and stop all flow of fuel through the control device 10. In order to initiate further operation of the control device 10, the button 50 must again be depressed to permit lighting of the pilot burner.

The abnormal temperature sensing switch 92 is calibrated to open at the predetermined abnormal temperature during assembly thereof, and the calibrated abnormal temperature is determined from the heat loss between water temperature and the abnormal temperature sensing switch. That is, the abnormal temperature sensing switch 92 is calibrated to open at a temperature less than the maximum temperature within the tank of the water heater due to its external positioning; however, heat conduction to the abnormal temperature sensing switch is very good due to its mounting in housing 144 directly on shank 104, the exposure of the shank to water temperature directly and through tube 126 of the thermostat 124 and the insulation 109 between the shank and the casing of the control device 10 which minimizes any heat sink effect of the control device.

The abnormal temperature sensing switch 92 can be easily removed from the shank 104 by use of a tool, such as a pliers, to reach behind the control device 10 and slide the abnormal temperature sensing switch from the housing 144. In this manner, servicing, maintenance, replacement and/or repair are facilitated, and there is no need to remove the entire assembly in order to gain access to the abnormal temperature sensing switch as in the prior art.

Inasmuch as the present invention is subject to many variations, modifications and changes in detail, it is intended that all matter described above or shown in the accompanying drawings be interpreted as illustrative and not in a limiting sense.

What is claimed is:

1. A thermally responsive assembly for controlling fuel flow to an appliance comprising
    a control device housing thermostatically operated valve means and safety valve means therein for controlling flow through said control device;
    a mounting shank having a flange mounting said control device and a body extending from said flange having a mounting portion adapted to be mounted on the appliance and a central bore therethrough;
    a thermostat mounted on said body of said mounting shank to extend into the appliance, said thermostat having means extending through said bore in said body and operating said thermostatically operated valve means;
    an abnormal temperature sensing switch controlling operation of said safety valve means; and
    a housing carried by said body between said flange and said mounting portion removably mounting said abnormal temperature sensing switch whereby said abnormal temperature sensing switch is disposed externally of the appliance;
    said mounting shank and said housing being integrally formed as a one-piece structure;
    said body having an externally threaded portion defining said mounting portion and a smooth cylindrical portion joining said threaded portion and said flange and having a recess therein, said housing being disposed in said recess; and
    said recess and said housing being disposed on an axis transverse to an axis defined by the central bore of said body.

2. A thermally responsive assembly as recited in claim 1 and further comprising a layer of thermally insulating material disposed between said flange of said mounting shank and said control device.

3. A thermally responsive assembly for controlling fuel flow to an appliance comprising
    a control device housing thermostatically operated valve means and safety valve means therein for controlling flow through said control device;
    a mounting shank having a flange mounting said control device and a body extending from said flange having a mounting portion adapted to be mounted on the appliance and a central bore therethrough;
    a layer of thermally insulating material disposed between said flange of said mounting shank and said control device;
    a thermostat mounted on said body of said mounting shank to extend into the appliance, said thermostat having means extending through said bore in said body and operating said thermostatically operated valve means;
    an abnormal temperature sensing switch controlling operation of said safety valve means;
    a housing carried by said body between said flange and said mounting portion removably mounting said abnormal temperature sensing switch whereby said abnormal temperature sensing switch is disposed externally of the appliance;

said body having an externally threaded portion defining said mounting portion and a smooth cylindrical portion joining said threaded portion and said flange and having a recess therein, said housing being disposed in said recess; and said housing being cylindrical and having an axis disposed transverse to the axis of said body and spaced therefrom to form a secant with the surface of said smooth portion.

4. A thermally responsive assembly for controlling fuel flow to an appliance comprising a control device housing thermostatically operated valve means and safety valve means therein for controlling flow through said control device;

a mounting shank having a flange mounting said control device and a body extending from said flange having a mounting portion adapted to be mounted on the appliance and a central bore therethrough;

a layer of thermally insulating material disposed between said flange of said mounting shank and said control device;

a thermostat mounted on said body of said mounting shank to extend into the appliance, said thermostat having means extending through said bore in said body and operating said thermostatically operated valve means;

an abnormal temperature sensing switch controlling operation of said safety valve means;

a housing carried by said body between said flange and said mounting portion removably mounting said abnormal temperature sensing switch whereby said abnormal temperature sensing switch is disposed externally of the appliance; and said housing being cylindrical and said abnormal temperature sensing switch having a tubular casing slidably received in said housing.

* * * * *